W. T. ALLIGER, J. W. GAMBLE & G. H. GIBSON.
METHOD OF WATER PURIFICATION.
APPLICATION FILED JULY 15, 1911.
1,078,655.
Patented Nov. 18, 1913.
2 SHEETS—SHEET 1.
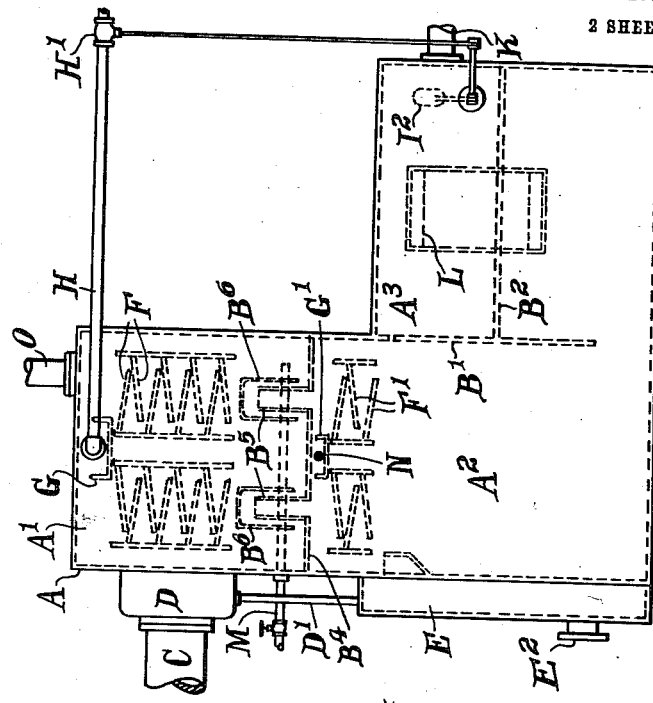
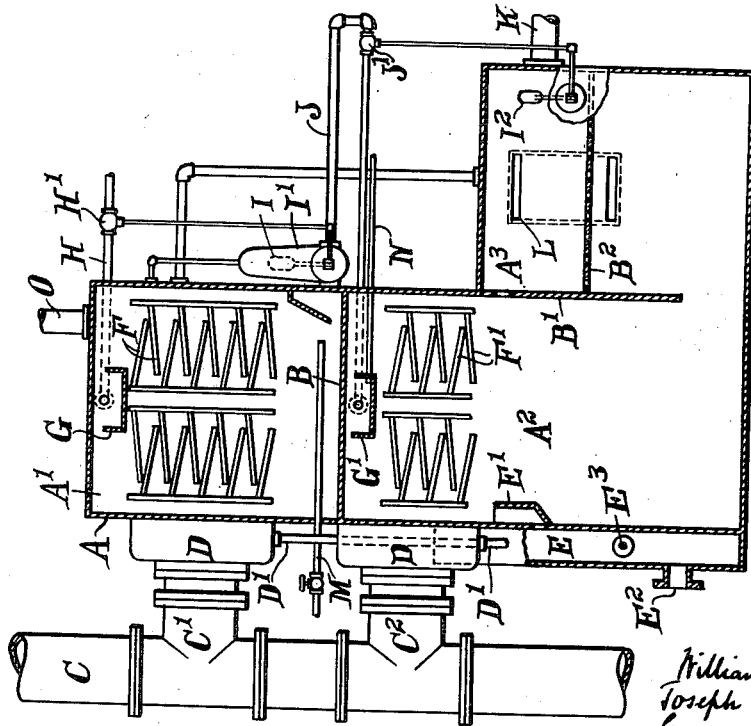

W. T. ALLIGER, J. W. GAMBLE & G. H. GIBSON.
METHOD OF WATER PURIFICATION.
APPLICATION FILED JULY 15, 1911.
1,078,655.
Patented Nov. 18, 1913.
2 SHEETS—SHEET 2.
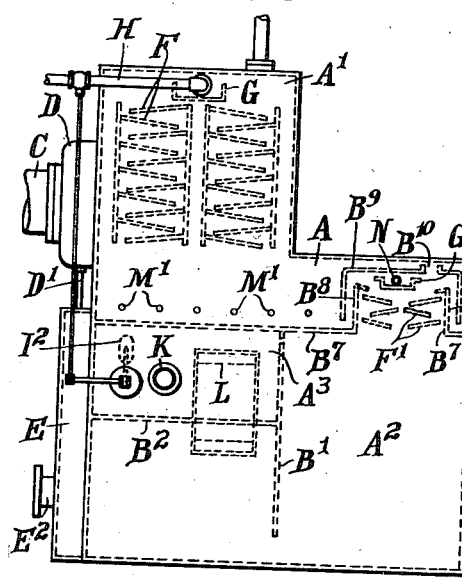
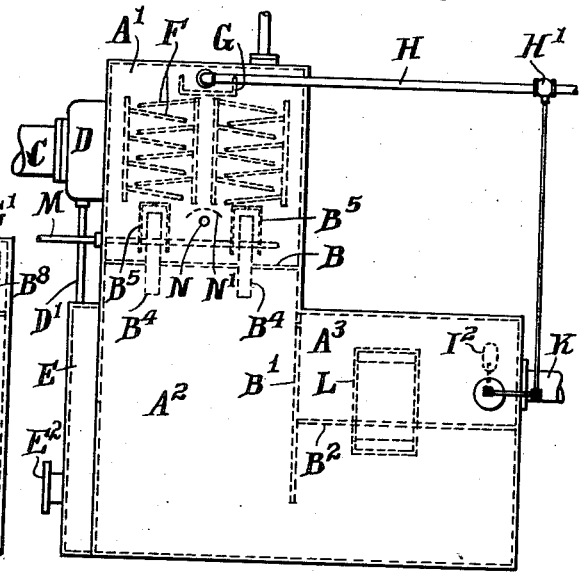
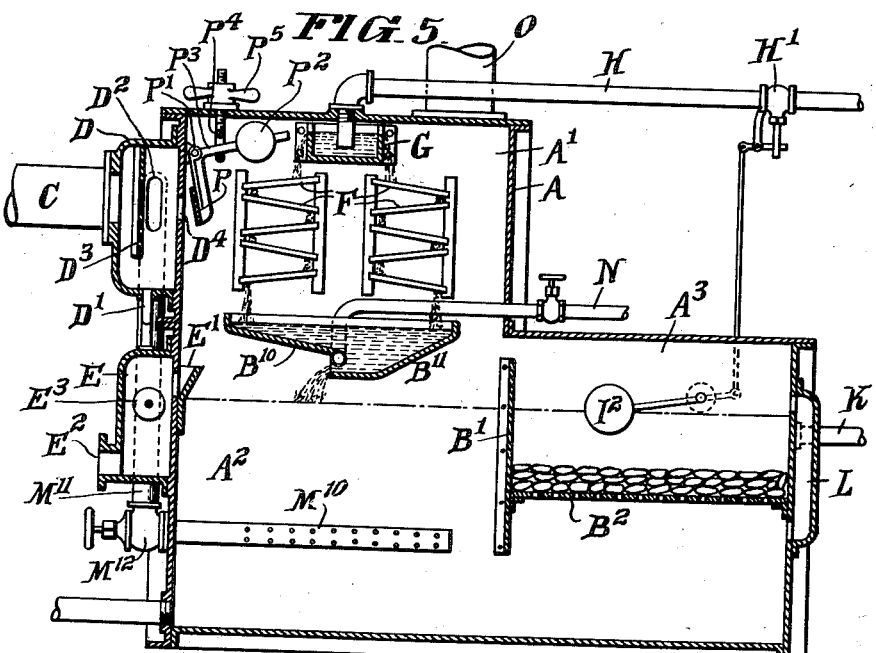
Witnesses
Daniel Webster, Jr.
Stewart
Inventors
William T. Alliger
Joseph W. Gamble
George H. Gibson
By Francis T. Chambers
Attorney

UNITED STATES PATENT OFFICE.

WILLIAM T. ALLIGER AND JOSEPH W. GAMBLE, OF PHILADELPHIA, PENNSYLVANIA AND GEORGE H. GIBSON, OF MONTCLAIR, NEW JERSEY, ASSIGNORS TO JOSEPH S. LOVERING WHARTON, WILLIAM S. HALLOWELL, AND JOHN C. JONES, ALL OF PHILADELPHIA, PENNSYLVANIA, AS FIRM OF HARRISON SAFETY BOILER WORKS, OF PHILADELPHIA, PENNSYLVANIA.

METHOD OF WATER PURIFICATION.

1,078,655.                Specification of Letters Patent.     Patented Nov. 18, 1913.

Application filed July 15, 1911. Serial No. 638,617.

*To all whom it may concern:*

Be it known that we, WILLIAM T. ALLIGER and JOSEPH W. GAMBLE, of the city and county of Philadelphia, in the State of Pennsylvania, and GEORGE H. GIBSON, of Montclair, Essex county, New Jersey, all citizens of the United States of America, have invented certain new and useful Improvements in Methods of Water Purification, of which the following is a true and exact description, reference being had to the accompanying drawings, which form a part thereof.

Our present invention consists in an improved method of water purification particularly adapted for heating water and eliminating temporary and permanent hardness constituents therefrom to fit the water for boiler feed and other industrial purposes.

The primary purpose of the invention is to provide a practical improvement in that method of water purification in commercial use on an extensive scale in which the water to be treated is passed through an open feed water heater in which it is heated by the direct action of steam supplied to the heater and a chemical reagent or reagents is added to the water as it enters the heater or prior to its admission thereto. The purpose and effect of this treatment is the production of hot water from which objectionable impurities have been precipitated or partly precipitated and partly converted into compounds which remain in solution in the water treated and are less objectionable than the original impurities.

The above described method of water purification, which is known as a "hot process", as we have already indicated, is in commercial use on an extensive scale and has given generally satisfactory results except as hereinafter noted. The waters treated in accordance with this process differ greatly in the character and amount of impurities contained by them. These impurities will vary from a very few grains or so to 125 grains per gallon, but the average water contains from 15 to 25 grains per gallon of impurities in the form of soluble salts. In nearly all cases these salts consist of a mixture of all or some of the following substances: silica, oxids of iron and aluminum, carbonates, sulfates and chlorids of calcium and magnesium and carbonates and chlorids of sodium and potassium, present either as stated, or disassociated, or in combination with other elements. In many cases the principal impurities in the water which require elimination or conversion are the carbonates of calcium and magnesium which give the water temporary hardness, and the sulfates of calcium and magnesium which give permanent hardness to the water. The chemical reagents ordinarily added to the water in its purification by the hot process are soda ash ($Na_2CO_3$), tri-sodium phosphate ($Na_3PO_4$), barium hydrate ($Ba(OH)_2$), sodium hydroxid ($NAOH$), although other reagents and various mixtures of reagents are employed. The kind of reagent or mixture of reagents best fitted for treating a given water in a given place depend in part upon the character of the impurities in the water and in part on the availability and cost of the reagents. In practice, the reagent most generally available and most commonly employed is soda ash. When water containing carbonates and sulfates of calcium and magnesium is treated with soda ash and heated under proper conditions, the calcium and magnesium contents of the water are nearly all precipitated as monocarbonates of calcium and magnesium with the production of sodium sulfate which remains in solution. Sodium sulfate, unless present in excessive amounts, is not particularly objectionable in water for most industrial purposes, and in particular does not yield objectionable boiler incrustations.

In treating water containing carbonates of calcium and magnesium, and other impurities such as the sulfates of calcium and magnesium, by the hot process as heretofore practised, certain practical defects in the process have been experienced, of which the following are the most important: (1.) In order to effect a conversion of the sulfates, or other non-carbonate impurities, within the heater, substantially more soda ash or other reagent has been found necessary in practice than is theoretically required to effect the reactions. (2.) The precipitation of the carbonates of calcium and magnesium in the heater has been unduly slow. (3.)

The test solution ordinarily used to determine when sufficient reagent has been added to convert the sulfates does not give its proper indication and the operator is without a satisfactory guide as to the proper amount of soda ash or other reagent to feed into the water. (4.) The excess of reagent material ordinarily fed into the water under these conditions is in itself objectionable, in addition to the waste involved. For instance, when soda ash is the reagent, its use in excess conduces to foaming in the boiler and results in the corrosion of brass fittings, the destruction of rubber gaskets and similar troubles.

The specific object of the present invention is to overcome the objections to the hot process system of water purification referred to above, and this we accomplish by thoroughly eliminating all free and nearly all half bound carbon dioxid from the water, prior to the addition of the soda ash or other chemical reagent or reagents employed to effect the precipitation or conversion of the non-carbonate impurities in the water. This elimination we effect by heating the water and agitating it to break up the bicarbonates and liberate the half bound carbon dioxid which with the free carbon dioxid is driven out of the water in the gaseous form, opportunity being provided for the free escape of the carbon dioxid thus driven out of the water. Preferably in most cases, though this is not absolutely essential, we effect the removal of the free and half bound carbon dioxid in the same heater in which the chemical reagent is added and in which the precipitation of impurities occurs, although in many cases we find it desirable to provide a heater with separate compartments in which different steps of the process are carried on. The heating of the water and its agitation to effect the removal of the free and half bound carbon dioxid may be effected by injecting either live or exhaust steam into a pool through which the water treated passes or it may be effected by causing the water to flow in film like and broken streams through a steam space into which the steam for heating the water is admitted, or by a combination of these two methods.

It is believed that the more important of the principles underlying our invention are correctly explained as follows: Carbon dioxid exists in water in the free state as carbonic acid ($H_2CO_3$); half bound as bicarbonates, ordinarily of calcium and magnesium $Ca(HCO_3)_2$ and $Mg(HCO_3)_2$; and, third, as the normal carbonates chiefly in this form, as carbonate of soda ($Na_2CO_3$). The normal carbonates of calcium and magnesium are not found in natural waters except in relatively small amounts owing to their low solubility. Any carbonate ordinarily found in natural water is inevitably in the form of the bicarbonate if the water contains carbon dioxid in excess of that necessary to form the normal carbonate, and conversely, free carbon dioxid is not found in water except when the carbonates in solution therein are all in the form of bicarbonate.

When soda ash is added to water containing bicarbonates and sulfates of calcium and magnesium and the water is then heated as in the ordinary hot process as heretofore practised the soda ash is converted in whole or in part from sodium carbonate into sodium bicarbonate. This action is more pronounced when the water contains free carbon dioxid than when the latter is absent, but sodium bicarbonate is a more stable compound than the bicarbonates of calcium and magnesium and, when the water is heated a part, at least, of the carbon dioxid liberated from the bicarbonates of calcium and magnesium combines with the sodium carbonate in the water to form sodium bicarbonate. Substantially more heating and agitation of the water is required to drive off the half bound carbon dioxid from sodium bicarbonate than is required to break up the bicarbonates of calcium and magnesium. Bicarbonate of sodium, moreover, is substantially less effective than the normal carbonate of sodium for converting the sulfates of calcium and magnesium into the carbonates of calcium and magnesium.

The presence of the free and half bound carbon dioxid in the water treated by the hot process method as heretofore practised is similarly objectionable when the chemical reagent employed is not soda ash but consists of or contains sodium hydroxid, tri-sodium phosphate, or barium hydroxid. When sodium hydroxid is used the first action is the conversion of sodium hydroxid into sodium normal carbonate and then the sodium normal carbonate is further converted into sodium bicarbonate. In the case of tri-sodium phosphate, the presence of the free or half bound carbon dioxid hinders the precipitation of the calcium and magnesium salts which would otherwise come down as normal phosphates. In the case of barium hydroxid the free and half bound carbon dioxid converts the hydrate into barium carbonate which is insoluble with the result that the barium carbonate which is a very heavy salt settles out so quickly that the largest percentage of its reactive power is destroyed since it does not come into contact with the greater portion of the water.

The indicator ordinarily employed in practice to determine the amount of reagent to be added to effect the conversion of the sulfates is a solution in alcohol of the organic salt known as phenol-phthalein.

When a drop or two of this solution is added to water, which contains any free carbon dioxid; or bicarbonate without the presence of normal carbonates of an alkali no color is obtained. However, if a normal carbonate of any alkali or any hydroxid is contained in the water a pink color is obtained varying in degree of color to the amount of normal alkali carbonate or any hydroxid which is present. This shows that the water has an alkaline reaction. Other salts, as calcium sulfate, sodium sulfate and sodium chlorid are preferably neutral to the action of phenol-phthalein and will neither cause discoloration nor coloration of the test solution.

In treating water having calcium and magnesium sulfates in solution and to which a reagent such as soda ash has been added, the test solution is relied upon to show the presence of sodium carbonate. When the sodium carbonate has been added in quantity sufficient to, and has effected a conversion of the sulfates into carbonates under such conditions that sodium carbonate remains in solution after the conversion of the sulfates is effected, a color is immediately obtained in the test solution. When the water contains bicarbonates of calcium and magnesium with or without free carbon dioxid in solution no color will be obtained from the test solution until soda ash has been added in an amount in excess of that required to establish an equilibrium in the solution between the bicarbonates of calcium and magnesium and sodium, and this equilibrium will usually not be obtained until soda ash has been added very substantially in excess of the desirable amount which is the amount just sufficient to effect a conversion of the non-carbonate impurities in the water.

By thoroughly eliminating all free and half bound carbon dioxid by preliminarily boiling and agitating the water in accordance with the present invention, we effect a substantially better purification of water containing temporary and permanent hardness giving impurities than has been obtainable by the hot process of water purification as heretofore practised. We accomplish this, moreover, with the use of less soda ash or other reagent and with less prolonged maintenance of the water in a settling chamber than has heretofore been required to obtain results at all satisfactory, and we make it possible to satisfactorily employ the most desirable test solution or indicator, phenol-phthalien, for determining the amount of reagent required. Furthermore, the process may be carried out with apparatus of the same type as that heretofore employed for purifying and preheating water for boiler feed, and other industrial purposes. In general the only change in the apparatus required is the provision of the means of injecting steam into the heater below the water level or an increase in the extent of the tray area over which the water flows while being heated or changes in both respects. As before stated, however, we prefer, in many cases to employ an open feed water heater having separate preliminary heating and settling chambers.

For a better understanding of the invention reference should be had to the accompanying drawings and descriptive matter, in which we have illustrated and described various forms of apparatus suitable for carrying out the invention, though, as we have already indicated, the invention in its broader aspects is not limited to use by the aid of any special form of apparatus.

Of the drawings: Figure 1 is an elevation in section illustrating one form of apparatus which may be employed in carrying out our invention, and Figs. 2, 3, 4 and 5 are diagrammatic representations each showing a different form of apparatus which may be used in carrying out our invention.

In the drawings, and referring first to the construction shown in Fig. 1, A represents the shell of an open feed water heater. This shell is divided into an upper main compartment A' and a lower main compartment $A^2$ by a partition B. A filter compartment $A^3$ is formed in the main compartment $A^2$ by the perforated bottom wall $B^2$ and the vertical partition wall B'. A water distribution box G and a set of inclined trays F over which the water discharged from the distribution box flows in film like and broken streams are provided in the compartment A'. A similar distribution box G' and set of trays F' are provided in the upper end of the compartment $A^2$.

H represents the raw water supply pipe which discharges into the distribution box G. The flow of water to the heater through the pipe is controlled by a valve H' which is automatically actuated to prevent the water level in the compartment A' from rising above some predetermined level at or somewhat below the bottom tray F, by a suitable float mechanism. As shown, the valve H' is connected to the float located in the float chamber I' into which water flows from the chamber A' and from which water flows through the pipe J to the distribution box G' in chamber $A^2$. The flow through the pipe J is controlled by a valve J' operated by a float $I^2$ responsive to the water level in the compartment $A^3$.

Steam for heating the water supplied to the compartments A' and $A^2$ passes into these compartments from the supply pipe C through branches C' and $C^2$, each connected to the corresponding heater compartment through an oil separator D of usual form.

The oil collecting in the lower ends of the separator D passes through the pipe connections D' to a box E, which serves also as an overflow box into which water flows from the compartment $A^2$ when the water level in that compartment rises to the top of the overflow channel E' opening to the overflow box E. The discharge from the box E through the discharge port $E^2$ may be controlled by a valve (not shown) and a float $E^3$ for operating it as is usual in this type of apparatus. The steam supplied to the heater through the pipe C may be live steam, but in practice is ordinarily exhaust steam from steam engines. In addition to the steam supplied to the heater from the pipe C a perforated pipe M is employed for injecting live steam or exhaust steam into the compartment A' below the water level therein in order to further heat and agitate the water collected in the lower end of the compartment A' from the trays F. The chemical purifying agent for precipitating the non-carbonate impurities is introduced into the water distribution box G' through the supply pipe N. The purified and heated water is withdrawn from the heater through the pipe K which leads from the filter chamber $A^3$ and bypass L about the filter bed mounted on the partition $B^2$ is provided to insure a sufficient supply of water to the inlet end of the pipe K even though the filter bed may become so clogged up as to prevent a sufficient flow through it. The carbon dioxid air and other gases liberated from the water treated as well as excess steam escapes through the vent pipe O which may contain a loaded escape valve as usual, set to maintain a steam pressure of a few ounces or pounds in the compartment A'.

The apparatus shown in Fig. 2 differs from that of Fig. 1 principally in the manner in which the water is passed from the compartment A' to the compartment $A^2$ of the heater and the manner in which steam is supplied to the compartment $A^2$. In Fig. 2, the baffle $B^4$ separating the compartment A' and $A^2$ is formed with open ended hollow bosses $B^5$ projecting from its upper side thus limiting the water level in the compartment A' approximately to the level of the tops of the bosses $B^5$. To restrict fluctuations in the discharge from the compartment A' to the compartment $A^2$ through the bosses $A^5$ these are surrounded by inverted cap like members $B^6$ perforated at the top so that steam may pass from the compartment A' into the compartment $A^2$. In Fig. 2 there are no provisions for passing steam in the compartment $A^2$ except as it enters that compartment from the compartment A'. In Fig. 2 no water is passed directly to the distribution box G' which in this construction serves merely as a distributer for the purifying reagent.

The apparatus shown in Fig. 3 is essentially the same in its general construction and mode of operation as the apparatus in Fig. 2, except as to the location of the distribution box G' and the trays F'. In Fig. 3, the baffle $B^7$, corresponding generally to the baffles B and $B^4$ of Figs. 1 and 2, is formed with upstanding portions $B^8$ between which are located the trays F'. The portions $B^8$, trays F' and distribution box G' are inclosed by an inverted trough-shaped member $B^9$ formed with a steam passage $B^{10}$ in its upper portion. In Fig. 3 we have shown a plurality of pipes M' for injecting steam into the water in the compartment A' below the water level therein. It will be understood that in all of the forms of apparatus disclosed the number of these pipes used and their location will vary with the conditions of use and character of apparatus employed.

The construction shown in Fig. 4 differs from that shown in Fig. 2 in the fact that the chemical supply pipe N is located in the compartment A' below the water level therein and in the omission of the trays F' and the distribution box G' from the compartment $A^2$. To insure a steady discharge from the pipe N when arranged within the compartment A' we prefer to cover it with a trough like hood N' as shown.

In the construction shown in Fig. 5 steam may circulate freely in all portions of the heater above the water level therein. In this form of apparatus the water discharged from the trays F is collected by a trough like structure $B^{10}$ located between the trays and provided with a central discharge passage $B^{11}$ and the pipe N feeds the chemical into the water in the receptacle $B^{10}$ adjacent its discharge opening. In this form of our invention also the steam injected into the water below the water level for the purpose of mechanically agitating as well as heating the body of water is supplied from the steam supply pipe C which supplies steam to the heater above the water level. To accomplish this we employ a pipe $M^{11}$ and valve $M^{12}$ to connect the perforated pipe $M^{10}$ located below the water level to the port $D^2$ opening from the separator D at the outlet side of the oil catching baffle $D^3$, and we provide a loaded valve P controlling the port $D^4$ opening directly from the oil separator into the steam space of the heater. This valve P, as shown, is a flap valve pivoted at P' and provided with an adjustable loading device in the form of a weight $P^2$ carried by the arm $P^3$ of the valve. The function of the valve P is to throttle the admission of steam into the heater through the port $D^4$ sufficiently to maintain a pressure in the separator such that the proper quantity of steam will be discharged into the heater through the pipe $M^{10}$ notwithstanding the head of water opposing this discharge. The valve P may be locked in the open or closed position by means of the yoke P⁴ and the external nut P⁵.

It will be apparent to those skilled in the art that the apparatus disclosed embodies the characteristic features of the well known open feed water heater but differs from the type of the open feed water heater in common use in the provisions for mixing the chemical purifying reagent with the water only after the water has been subjected to the heating action and mechanical agitation sufficient to break up the bicarbonates in solution in the water and drive off the liberated as well as the initially free carbon dioxid, which with the air and other vapors contained in the water and any excess of steam supplied to the heater escapes through the vent pipes O. In practice we prefer to arrange the trays F so that the water spreads over these trays in thinner films and takes a longer time in passing over the trays than in the ordinary open feed water heaters heretofore in common use. In addition to agitating the water to free it from the free and half bound carbon dioxid we prefer also to agitate the water and supply heat to it after the chemical reagent for reacting with the non-carbonate impurities has been added to the water in order to thereby further the chemical reactions between this reagent and the impurities in the water, and this result is accomplished with all of the forms of apparatus disclosed.

While in accordance with the provisions of the statutes we have illustrated and described the best mode of utilizing our invention now known to us, it will be apparent to those skilled in the art that departures may be made from the modes described without departing from the spirit of our invention and that the invention may be carried out by means of apparatus other than that described herein.

Our present invention is independent in a general way of any particular form of apparatus for utilizing it and certain novel features of the apparatus disclosed herein are not our joint invention, but are described and claimed in applications Serial Numbers 527,205; 574,859 and 599,689, filed 10th November 1909, 1st August 1910 and 28 December 1910, respectively, by Joseph W. Gamble, one of the joint inventors herein named and in an application Serial No. 633,408 filed June 15, 1911 by George H. Gibson, another of the joint inventors herein named.

Having now described our invention what we claim as new and desire to secure by Letters Patent is:

The method of heating and purifying water in an open feed water heater, which consists in so relatively supplying the water to be heated and steam for heating the water that the latter is heated and mechanically agitated to an extent sufficient to break up the bicarbonates in solution in the water and to drive off the free and liberated carbon dioxid and therafter admixing with the water a chemical reagent adapted to react with the non-carbonate impurities contained in the water and again agitating the water while supplying heat thereto to further the reaction between said reagent and the impurities contained in the water under conditions permitting the free escape of gases liberated from the water.

WILLIAM T. ALLIGER.
JOSEPH W. GAMBLE.
GEO. H. GIBSON.

Witnesses:
ROBERT G. CLIFTON,
S. E. SCOTT.